US007814027B2

(12) United States Patent
DeLuca

(10) Patent No.: US 7,814,027 B2
(45) Date of Patent: Oct. 12, 2010

(54) MATCHMAKING JEWELRY AND METHOD

(76) Inventor: Joseph G. DeLuca, 2325 Rossmere St., Colorado Springs, CO (US) 80919

( * ) Notice: Subject to any disclaimer, the term of this patent is extended or adjusted under 35 U.S.C. 154(b) by 1210 days.

(21) Appl. No.: 11/408,143

(22) Filed: Apr. 20, 2006

(65) Prior Publication Data
US 2007/0250333 A1 Oct. 25, 2007

(51) Int. Cl.
G06Q 99/00 (2006.01)
A44C 9/00 (2006.01)
A44C 19/00 (2006.01)

(52) U.S. Cl. ........................................ 705/319; 63/15.1
(58) Field of Classification Search .................. 63/15.1; 705/319
See application file for complete search history.

(56) References Cited

U.S. PATENT DOCUMENTS

| 397,774 | A | | 2/1889 | Briggs |
| 566,617 | A | | 8/1896 | Patterson |
| 915,678 | A | | 3/1909 | Kantor et al. |
| 1,016,520 | A | | 2/1912 | Rabel |
| 1,758,447 | A | * | 5/1930 | Liebs .................. 63/15.1 |
| 3,596,380 | A | | 8/1971 | Williams |
| 3,739,341 | A | | 6/1973 | Tessler |
| 3,814,049 | A | | 6/1974 | Hunter |
| 3,959,989 | A | | 6/1976 | Bhandia |
| 3,968,661 | A | | 7/1976 | Williams |
| 4,077,237 | A | | 3/1978 | Loper |
| 4,184,344 | A | | 1/1980 | Pepin |
| 5,109,789 | A | | 5/1992 | Berman |
| 5,950,200 | A | | 9/1999 | Sudai et al. |
| 6,052,122 | A | | 4/2000 | Sutcliffe et al. |
| 6,058,876 | A | | 5/2000 | Keene |
| 6,249,282 | B1 | | 6/2001 | Sutcliffe et al. |
| 6,363,878 | B1 | | 4/2002 | Keene |
| 6,484,536 | B1 | * | 11/2002 | Gould .................. 63/15.1 |
| 6,526,779 | B2 | | 3/2003 | Foote |
| 6,735,568 | B1 | | 5/2004 | Buckwalter et al. |
| 6,757,719 | B1 | | 6/2004 | Lightman et al. |

(Continued)

OTHER PUBLICATIONS

"Sign of the Times: World's First Ring for Singles Lauches; Charter for a Single Friendly Britain." Business Wire. London. Apr. 28, 2005.*

(Continued)

Primary Examiner—Jamisue Plucinski
Assistant Examiner—Amanda Kirlin
(74) Attorney, Agent, or Firm—Reinhart Boerner Van Deuren P.C.

(57) ABSTRACT

A matchmaking ring and method of communicating personal status to another person is provided. The matchmaking ring of the present invention includes means for identifying personal characteristics of the ring wearer. The matchmaking ring further includes means for identifying desired personal characteristics of a potential partner of the ring wearer. When one matchmaking ring is compared or abutted to another matchmaking ring, the engagement or non-engagement between the two rings determines if two people are compatible. Further, the ring itself acts as an indicator to other people that the ring wearer may be a potential partner. Thus, the invention provides a method of wearing the matchmaking ring and identifying others that are wearing a similar matchmaking ring as a potential partner. The ring may be worn as a wedding ring to stave off unwanted advances from individuals who do not know of the ring's significance.

15 Claims, 6 Drawing Sheets

U.S. PATENT DOCUMENTS

| | | | |
|---|---|---|---|
| 7,069,108 B2 * | 6/2006 | Saarela et al. | 700/193 |
| 7,593,786 B2 * | 9/2009 | Saarela et al. | 700/193 |
| 2003/0089128 A1 | 5/2003 | Minassian | |

OTHER PUBLICATIONS

MEETME.BZ, website, http://www.meetme.bz/, date last visited Jul. 19, 2006, 1 page, http://meetme.bz/about.htm, date last visited Jul. 19, 2006, 1 page, http://meetme.bz/faq.htm, date last visited Jul. 19, 2006, 2 pages.

Singles Jewelry, website, http://www.singlesjewelry.com/guide.php, date last visited Sep. 4, 2008, 1 page.

Shi Symbol, website, http://www.shisymbol.com/, date last visited Sep. 4, 2008, 3 pages.

Singles-Ring, website, http://www.celi-baque.com/english.html, date last visited Sep. 4, 2008, 7 pages.

The Singles Ring, website, http://singlesring.com/index2.htm, date last visited Aug. 9, 2007, 1 page.

Soul Two Soul, website, http:www.soultwosoul.net/, date last visited Aug. 9, 2007, 1 page.

Silver Ring Thing, website, http://www.silverringthing.com/, date last visited Aug. 9, 2007, 3 pages, http://www.silverringthing.com/history.asp, date last visited Aug. 9, 2007, 1 page.

JLS: Just Looking Singles, website, http:www.justlookingsingles.com/ date last visited Aug. 9, 2007, 2 pages.

SINGELRINGEN, website, http://www.us.singelringen.comi, date last visited Aug. 9, 2007, 2 pages, http://www.us.singelringen.com/Default.aspx?docurnentID=295, date last visited Aug. 9, 2007, 3 pages.

* cited by examiner

MATCHMAKING JEWELRY AND METHOD

FIELD OF THE INVENTION

This invention relates generally to jewelry, and more particularly, to jewelry for determining one person's compatibility with another.

BACKGROUND OF THE INVENTION

A long-standing challenge in day-to-day life of single men and women is dating and trying to find that perfect match or partner. Many methods have recently been introduced in our culture to help solve this problem. These methods range from "match maker" consultants to speed dating parties to online dating. The later method of online dating has become successful as a means for meeting people. However, online dating can be cumbersome and can require one to sort through hundreds of online profiles. It is frustrating when one tries to make contact with people and no response is received because one's profile or pictures do not accurately represent that person. And conversely, it is difficult for one to make the same decisions about other people without meeting them and seeing how they interact with others, dress, present themselves, etc. There are many times that these meetings result in disappointment because the person one imagined in one's mind, with the information you received from a single or a few photographs, ends up not being what was expected. Thus, there are many people who still want to meet someone face-to-face.

However, many people who want to meet someone face-to-face still need a way to quickly identify whether the people they meet have desired personal characteristics. Furthermore, many people would like to know before talking to someone for an extended period of time whether someone is single. Additionally, those that want to meet people face-to-face may still be shy or have a difficult time initiating a conversation because they do not know of any commonalities between themselves and the person they would like to approach. Still further, many people would like to meet a potential match face-to-face, but do not wish to advertise to the general population that they are looking for a possible relationship.

There exists, therefore, a need in the art for a mechanism that allows single people to quickly identify if someone who they find attractive in a face-to-face meeting shares commonalities and personal characteristics and is available for a relationship.

BRIEF SUMMARY OF THE INVENTION

In view of the above described and other problems existing in the art, the present invention provides a matchmaking device and method that relieves many of the problems that surround dating. A matchmaking device of the present invention provides a common thread between two people, as well as an ice breaking device for both people because both people have a similar device which gives the individuals a topic of initial conversation and commonality. An embodiment of the matchmaking device according to the present invention advantageously allows one person to communicate his or her personal characteristics and desired personal characteristics to a potential partner quickly and easily.

In one embodiment, the invention provides a method of identifying and communicating with a potential partner a person's current status as being a potential partner themselves. The method includes the step of wearing a matchmaking ring indicating the status of being a potential partner. The method also includes the step of identifying a second person as a potential partner by identifying a ring that that person is wearing as also being a matchmaking ring. This method may also include steps of comparing the two rings and determining if each person has the desired characteristics of the other. In a preferred method of the present invention, the matchmaking ring is worn on the ring finger of the left hand. As such, the single status and desire to meet other singles is concealed from the general population who are not aware of the ring's purpose, thereby protecting the wearer from unwanted advances.

In another aspect, the invention provides a system for determining compatibility between two people based on personal characteristics of the individuals. The system includes two rings. Each ring includes means for identifying at least one personal characteristic of the ring wearer and means for identifying at least one personal characteristic desired by the ring wearer of a potential partner. When the two rings are abutted with one another, compatibility can be determined by the interaction of the different means on each ring.

In yet another embodiment, the invention provides a matchmaking device for determining personal compatibility with another person who has a similar matchmaking device. The device is preferably embodied as a ring having means for indicating at least one personal characteristic of the ring wearer as well as means for indicating at least one desired personal characteristic of a potential partner of the ring wearer. When the matchmaking device is aligned with a second similar matchmaking device of a potential partner, the compatibility of the ring wearer and the potential partner can be determined. Specifically, compatibility is determined when the means for indicating at least one personal characteristic of the ring wearer's matchmaking device appropriately aligns with the means for indicating at least one desired personal characteristic of a potential partner's matchmaking device.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
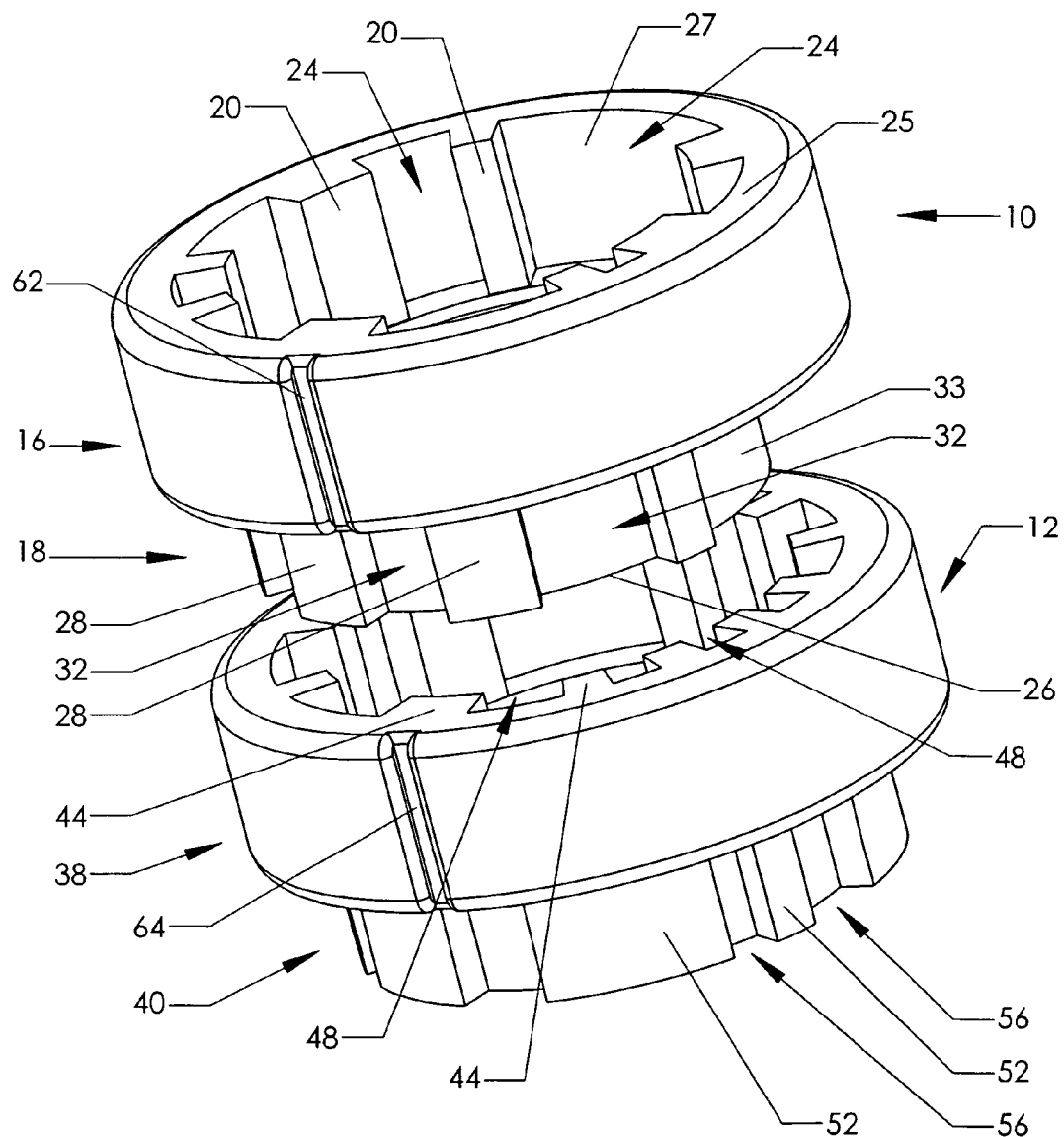
FIG. 1 is a perspective view of an exemplary embodiment of a pair of matchmaking rings constructed in accordance with the teachings of the present invention illustrating compatibility between two people.

Moving to the figures, FIG. 1 illustrates one embodiment of a first matchmaking ring 10 and a second matchmaking ring 12 constructed in accordance with the teachings of the present invention. The rings 10, 12 are devices to determine whether two people are compatible or have similar characteristics or have characteristics for which the other person is looking in a potential partner. It will be appreciated that partner, as is used with respect to the present invention, is not limited to an intimate partner but is broad enough to include platonic partners such as someone who has the same interest or interests, someone that another may wish to have a friendship with, someone who enjoys the same activities, and the like. The rings 10, 12 also identify the ring wearer as a potential partner for someone else. The rings 10, 12 are a way for individuals to quickly communicate information about themselves to another so that they can determine if they might be a suitable match, thereby making the dating process simpler and quicker. Thus, the rings 10, 12 are personal and unique to an individual and the pair of rings 10, 12 act much like a lock and a key, as will be explained more fully below.

The matchmaking rings 10, 12 are generally annular rings sized to be worn on a person's finger similar to other ring-type jewelry. However, the present invention is not limited to ring-type jewelry and the present invention could include other jewelry such as pendants, necklaces, watches, and the like. The rings 10, 12 may be made from almost any suitable jewelry material such as platinum, gold, white gold, silver, plastic, titanium, carbide and the like. Not only can the rings 10, 12 be made from various types of materials, the type of material may be used as a means of identifying a characteristic about the wearer, such as the wearer's economic status.

The finger on which a wearer wears the a ring 10 may further communicate information to other potential partners. If the ring wearer only desires to communicate with other people who have a match making ring or know the significance of the match making ring, the ring wearer may wear the ring on his or her left hand ring finger. In this position, those that do not know of the significance of the ring, i.e. that the wearer is looking for a partner, may view the ring on the left ring finger as a wedding ring and those people will not make advances toward the ring wearer. However, those that know the significance of the ring 10 will still continue to communicate with and make advances to the ring wearer. Thus, by wearing the ring on a specific finger, namely the left hand ring finger, the ring wearer reduced the amount of people that he or she would have to talk to by making those people perceive that he or she is married. Furthermore, the finger on which the person wears the ring could communicate other information such as a person's sexual orientation, or that the person is single but does not want to currently date anyone, or that the person is not looking for a serious relationship. These types of characteristics can change on any given day and thus it is beneficial that the wearer can change what he or she communicates without having to physically alter the ring.

Figure 2:
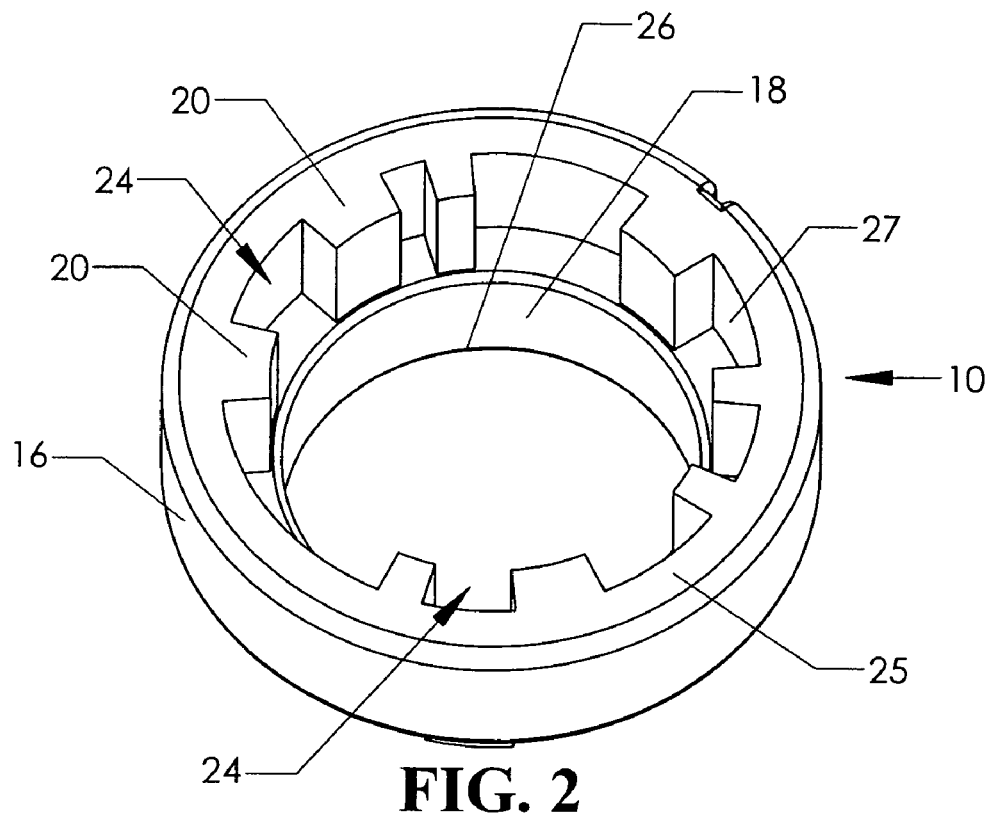
FIG. 2 is a perspective view of one of the rings of FIG. 1 illustrating the wearer's section of the ring.
Figure 3:
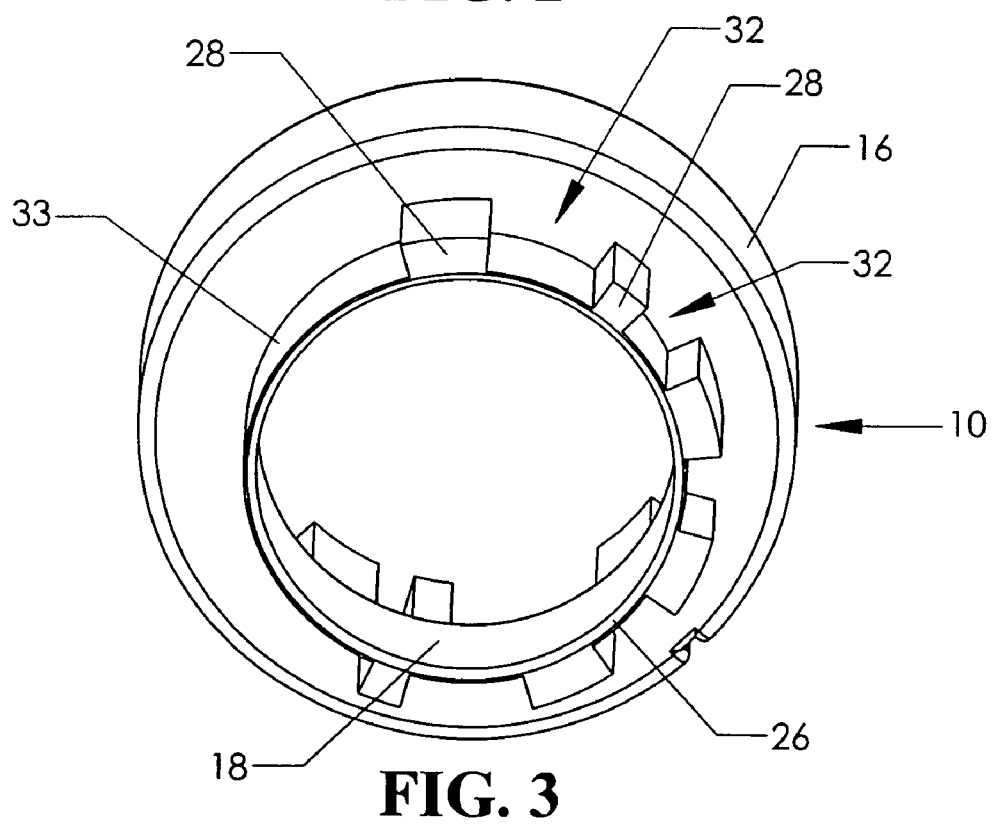
FIG. 3 is a perspective view of one of the rings of FIG. 1 illustrating the match's section of the ring.

With reference to FIGS. 1-3, the first ring 10 generally has two separate sections, a wearer's section 16 and a match's section 18. In the disclosed embodiment, the wearer's section 16 is similar to a receptacle or female part of a connector and the match's section 18 is a plug or male part of a connector. However, the sections may be reversed.

The wearer's section 16 indicates the personal characteristics of the wearer. The wearer's section 16 includes a plurality of protrusions 20 and grooves 24 angularly spaced around the central axis of the ring 10. These protrusions 20 and grooves 24 represent individual characteristics exhibited or possessed by the wearer. In the illustrated embodiment, the protrusions 20 extend radially inward from an inner surface 27 of the ring 10 and axially from a first end 25, or face, of the ring 10 toward a second end 26, or face, of the ring 10. In the illustrated embodiment, the protrusions 20 extend only a portion of the axial distance from the first end 25 to the second end 26. The grooves 24 are formed and positioned between adjacent protrusions 20.

The match's section 18 indicates the wearer's desired characteristics in a match. The match's section 18 also includes a plurality of protrusions 28 and grooves 32 that represent the desired and undesired characteristics of a person to which the wearer would like to talk and possibly date, i.e. a match. The protrusions 28 extend radially outward from an outer surface 33 of the match's section 18 of the ring 10 and axially from the second end 26 toward the first end 25. In an embodiment, as is shown, the protrusions 20, 28 extend from respective ends 25, 26 of the ring 10 only partially the axial length of the ring 10.

The second ring 12 is substantially similar to the first ring 10 and includes a wearer's section 38 and a match's section 40. The wearer's section 38 includes a plurality of protrusions 44 and grooves 48, and the match's section 40 further includes a plurality of protrusions 52 and grooves 56. The protrusions 44, 52 and grooves 48, 56 are unique to the wearer of the second ring 12 because the structures represent that wearer's personal characteristics as well as the wearer's desired personal characteristics in a potential partner, respectively.

Thus, when two rings 10, 12 are abutted with one another with the match's section 18 of the first ring 10 proximate the wearer's section 38 of the second ring 12, as is shown in FIG. 1, the protrusions 28 and grooves 32 of the first ring's match's section 18 and the protrusions 44 and grooves 48 of the second ring's wearer's section 38 act like a key. If the two rings 10, 12 can engage one another like a plug and socket, a possible match is determined.

In one embodiment, each ring 10, 12 includes an alignment groove 62, 64, respectively, for proper alignment of the rings 10, 12. Not only do the rings 10, 12 need to be aligned concentrically, the appropriate characteristics of the first ring 10 must be compared to the corresponding characteristics of the other ring 12. In a preferred embodiment, all grooves 24 of the female section, the wearer's section 16, will be the widest at the radial inner most location and at most as wide or narrower at an outer radial position. Conversely, the grooves 32 of the male section, the match's section 18, will be widest at the radially outer positions and at most as wide or narrower at the radially inner position. This configuration prevents the protrusions and grooves from forming dove tails and allows rings of different sizes to more easily engage one another.

To determine if a person is a potential match, a first person will wear a match-making ring 10. Next, the person will identify another person as a possible match by identifying the ring they are wearing as being a matchmaking ring 12. After approaching the other person, and using the embodiments of the present invention as illustrated in FIGS. 1-3, the two people remove their rings 10, 12 and compare the rings 10, 12 to determine if the match's section 18 of the first ring 10, mates with a wearer's section 38 of the second ring 12. As will be discussed more fully below, however, not all embodiments of the present invention must be removed to be compared.

If the two rings 10, 12 interlock and mate, this indicates that one person's desired characteristics are possessed by the second person. At this point, a one-way match has been indicated. However, in order to ensure that the second person's desired characteristics are possessed by the first person, i.e. a two-way match, the rings 10, 12 may be reversed and the wearer's section 16 of the first ring 10 aligned with a match's section 40 of the second ring 12. If the two rings 10, 12 interlock and mate in both configurations, then a match is determined.

As is shown in FIG. 1, the rings 10, 12 are a match and compatibility between the two people is realized because there are no interferences between the protrusions 28 of the match's section 18 of the first ring 10 and the protrusions 44 of the wearer's section 38 of the second ring.

Figure 4:
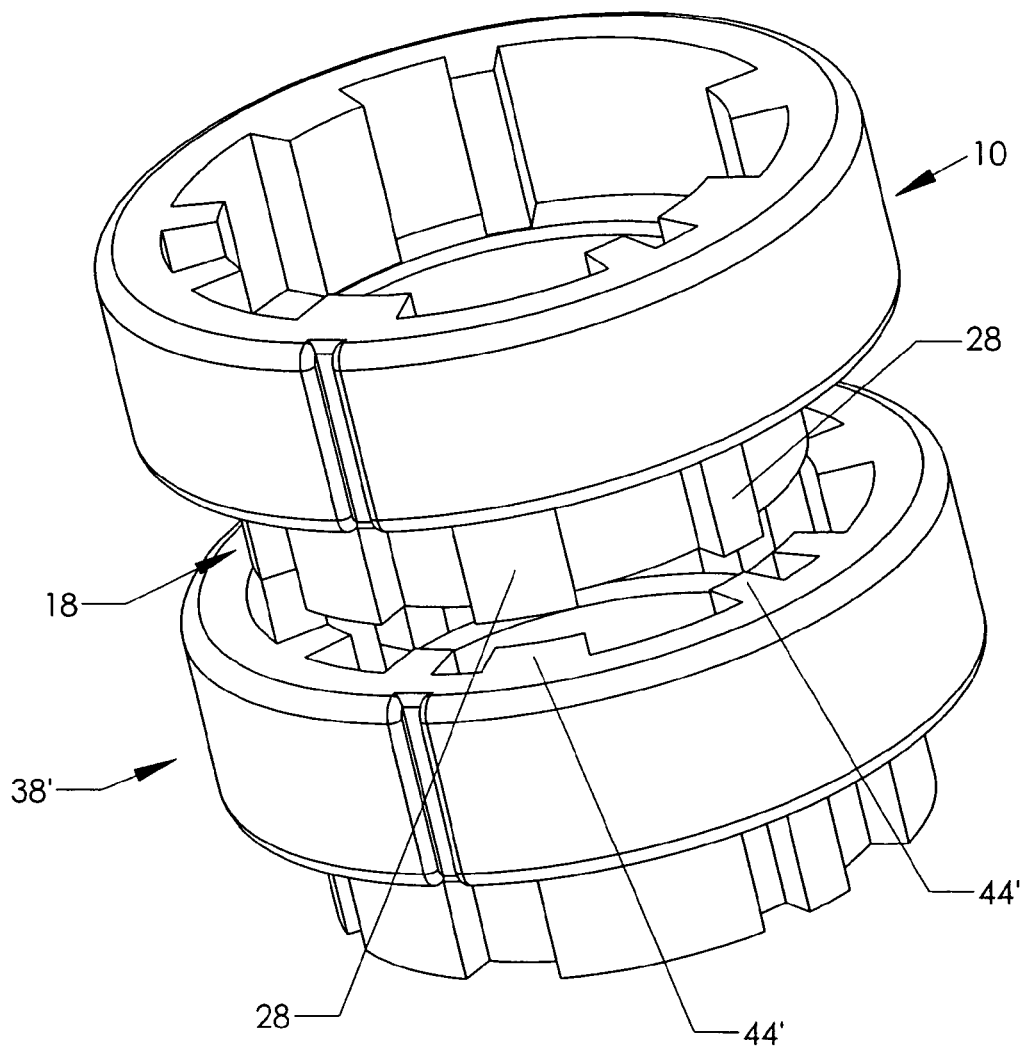
FIG. 4 is a pair of rings in accordance with the teachings of the present invention similar to those of FIG. 1 illustrating incompatibility between two people.
Figure 5:
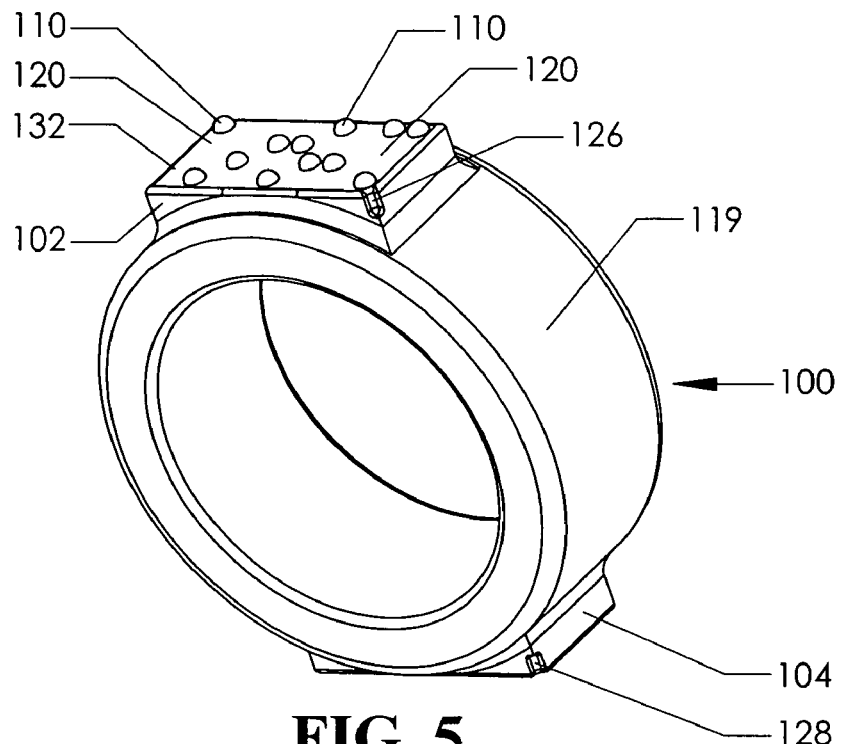
FIG. 5 is a perspective view of an alternative embodiment of a ring in accordance with the teachings of the present invention.
Figure 6:
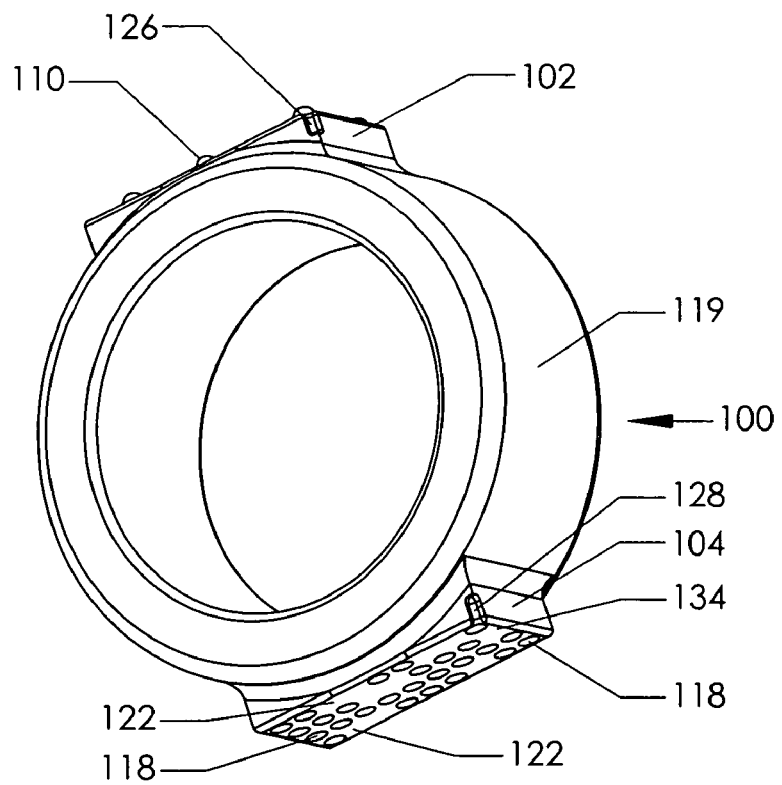
FIG. 6 is an alternative perspective view of the ring of FIG. 1.

FIG. 4 illustrates a situation where no match is made and the two people are preliminarily determined to be incompatible. In this case, the first ring 10 has protrusions 28 of the match's section 18 that align with protrusions 44' of the wearer's section 38' of the second ring 12' creating an interference. As these protrusions 28 and 44' align, the interference prevents the two rings 10, 12' from being connected indicating that the two people are preliminarily determined as incompatible.

However, just because the rings 10, 12' illustrate an initial incompatibility, the people do not have to stop talking to one another. The rings can serve the additional function of providing an "ice-breaker" for two people and a common thread about which the two people may talk. Even after an initial determination of incompatibility, the two may decide to continue to converse to further determine if they could be a possible match. However, the incompatibility of the rings can serve as a reason or easy way for one of the people to end the conversation if it is determined that the person does not want to continue to pursue the other person.

An alternative embodiment of the present invention is illustrated in FIGS. 5-8. The ring 100, shown in FIGS. 5 and 6, includes a wearer's nugget 102 and a match's nugget 104. The wearer's nugget 102 and match's nugget 104 function in a similar manner to the wearer's section 16 and match's section 18, respectively, of the previous embodiment. Specifically, the match's nugget 104 is used to align with a wearer's nugget 102' (see FIG. 8) of another ring to determine compatibility between the two ring wearers. In this embodiment, each nugget 102 and 104 includes a plurality of regions. Each region is assigned a separate personal characteristic. In an embodiment, the wearer's nugget 102 includes a plurality of protrusions 110 in different regions to represent an individual personal characteristic of the wearer. The match's nugget 104 includes a plurality of indentations 118 in different regions to represent an individual characteristic that the wearer desires in another person.

In one embodiment, the nuggets 102 and 104 are advantageously part of the outer radial periphery 119 of the ring 100. By being part of the radially outer periphery, the ring 100 does not need to be removed to compare the personal characteristics represented by one ring to the personal characteristics represented by another ring as discussed above. Another advantage of this design is that no matter the diametrical size of the ring 100, the nuggets 102, 104 as well as the included protrusions 110 and indentations 118, can be universally sized. This improves the interaction between a large ring, such as a size 13, with a small ring, such as size 5.

When a person configures, i.e. has their ring made, he or she indicates his or her personal characteristics from a predetermined list of characteristics. These characteristics are symbolized by a protrusion 110 in the corresponding region predetermined for that characteristic. If the person does not exhibit that characteristic, then that region would be left with a blank flat spot, indicated by reference number 120, of the wearer's nugget 102 illustrated in FIG. 5. The person also determines the characteristics that the person desires or is ambivalent about in a potential partner. These characteristics are symbolized as an indentation 118 in the corresponding region of the match's nugget 104. If the person does not desire a potential match to have a particular characteristic, the corresponding region of the match's nugget 104 does not include an indentation and has a blank flat spot, indicated by reference number 122 illustrated in FIG. 6. To ensure that appropriate regions align during a compatibility comparison, in one embodiment each nugget 102 and 104 includes an alignment groove 126, 128, respectively. These alignment grooves 126, 128 should be aligned when two separate rings are tested for a couple's possible compatibility as is illustrated in FIG. 8.

As this embodiment was described with the wearer's characteristics symbolized as protrusions 110 and the match's desired characteristics symbolized by indentations 118, one will recognize that the invention is not limited to this configuration and the indentations could be switched with the protrusions. Furthermore, as the illustrated embodiment has a separate wearer's nugget 102 and a separate match's nugget 104, an embodiment may have only a single nugget that has one section that provides the wearer's characteristics and another section for the desired match's characteristics. Furthermore, to make the rings more aesthetically pleasing, the wearer's characteristics and match's characteristics could be dispersed among the regions such that the indentations and protrusions are distributed about the surface of the nugget. Additionally, the protrusions can be provided by other materials and means than just the base material of the ring such as diamonds, rubies, sapphires, crystals, pearls, and other gemstones to further improve or vary the aesthetic appeal of the rings.

Figure 7:
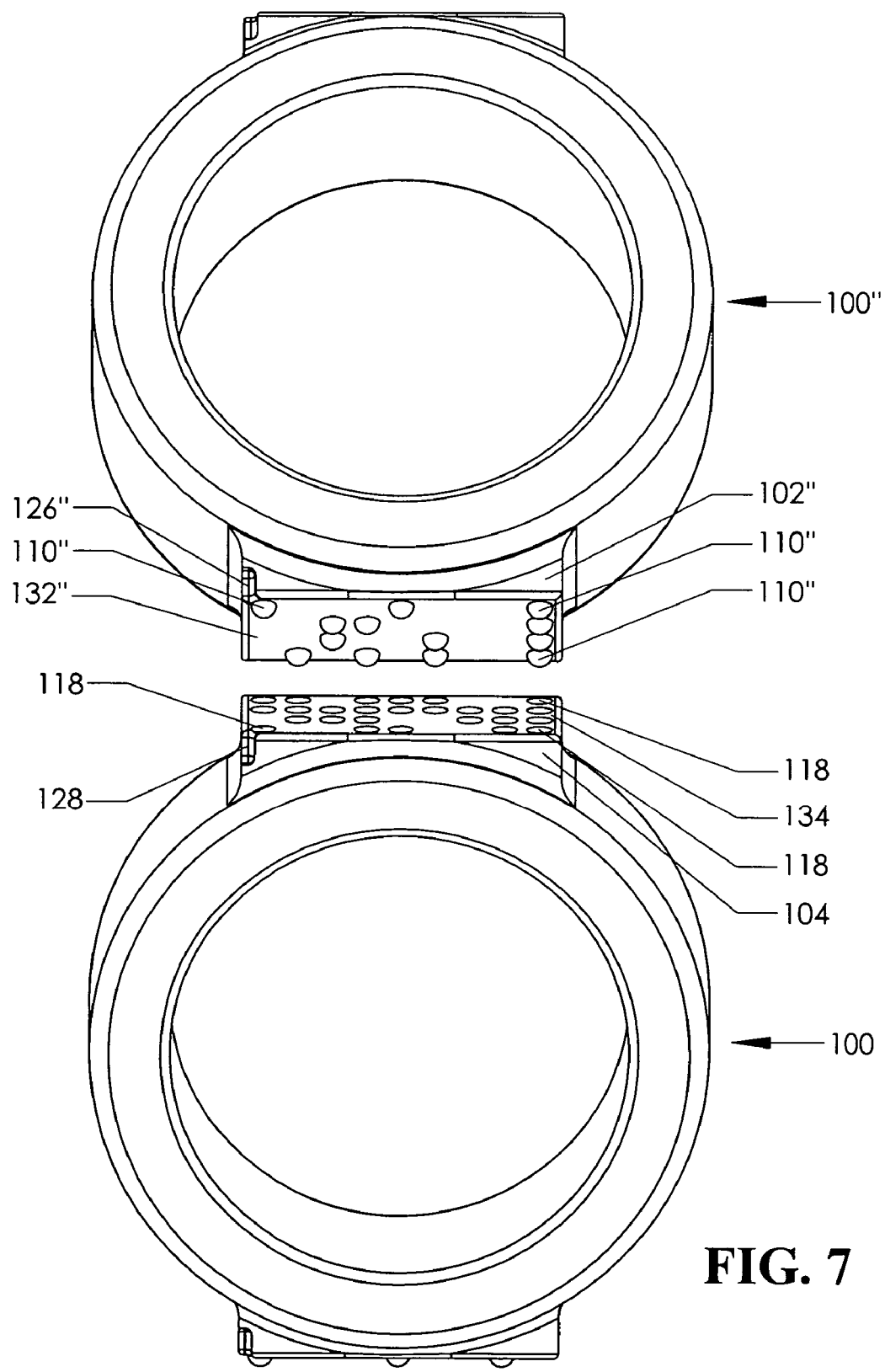
FIG. 7 is a partial perspective view of another pair of rings in accordance with the embodiment of FIG. 5 illustrating compatibility.

As is shown in FIG. 7, all of the protrusions 110" of a wearer's nugget 102" of a third ring 100" align with a corresponding indentation 118 of the match's nugget 104 of the first ring 100. In this situation an initial match will be determined as the flat surface 132" of the third ring's wearer's nugget 102" will abut smoothly with the flat surface 134 of the match's nugget 104 of the first ring 100 because all of the indentations 110" will be received by an indentation 118.

Figure 8:
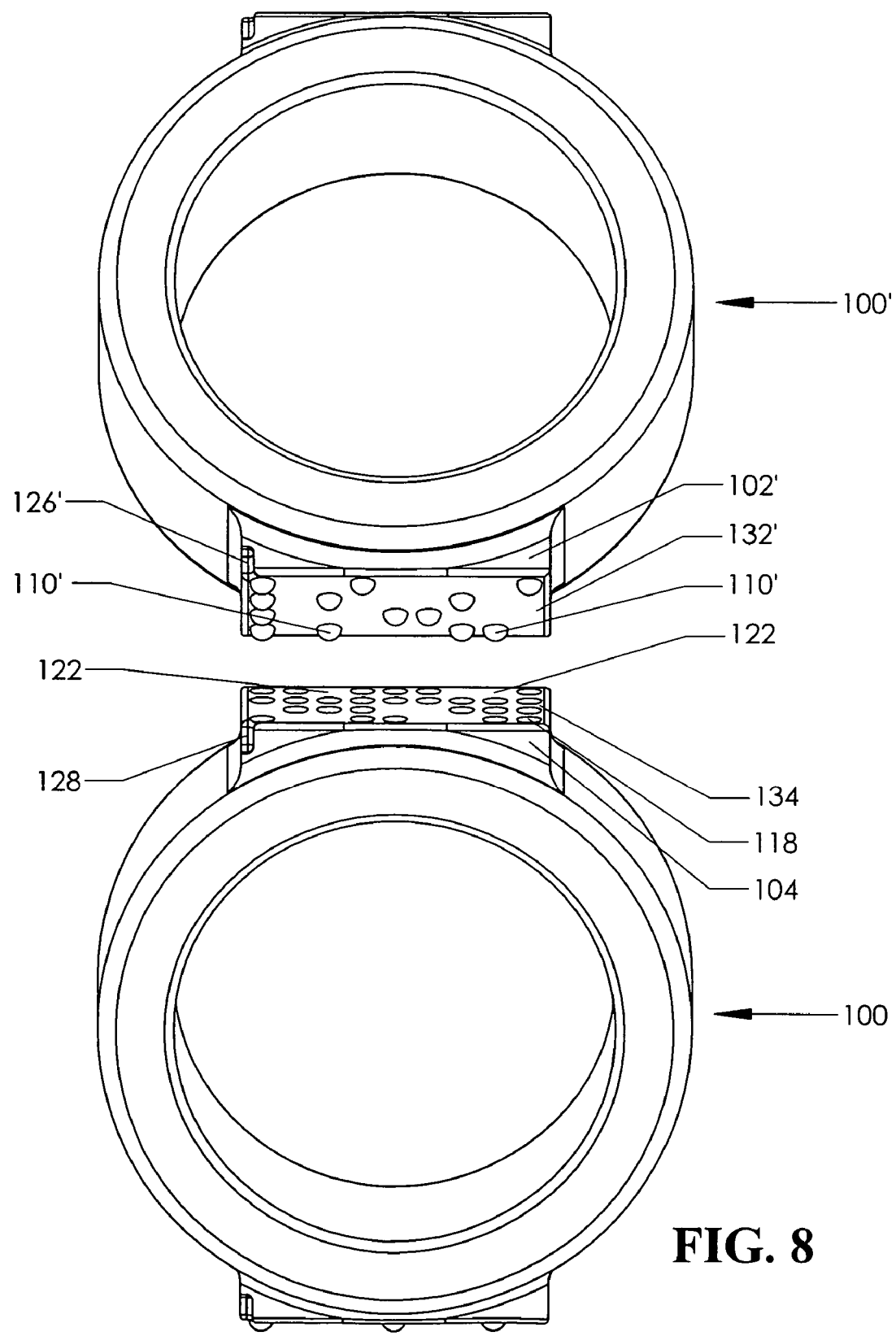
FIG. 8 is a perspective view of a pair of rings in accordance with the embodiment of FIG. 5 illustrating incompatibility.

In the illustrated embodiment, when a match is not made, as is illustrated in FIG. 8, at least one protrusion 110' of the wearer's nugget 102' of a second ring 100' will not match up with a corresponding indentation in the match's nugget 104 of the first ring 100 to receive the protrusion 110' of the second ring 100'. Specifically, the corresponding region of the first ring's match's nugget 104 will have a blank flat spot 122 which will cause an interference with the protrusion 110' of the second ring 100'. This interference will prevent a smooth planar abutment or engagement between the two rings 100, 100' indicating that the two rings 100, 100', and the corresponding ring wearers, are not compatible.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of identifying and communicating with a potential partner, comprising the steps of:
    configuring at least one of a first and second matchmaking ring by selecting at least one personal characteristic and at least one desired personal characteristic from a predetermined list of characteristics;
    wearing the first matchmaking ring, by a first ring wearer; and
    identifying a second ring wearer as a potential partner by identifying the second matchmaking ring that the second ring wearer is wearing; and
    wherein each of the first and second match making rings include first means for identifying the at least one personal characteristic of the ring wearer the first means corresponding to a selection of the at least one personal characteristic made during the step of configuring and a second means for identifying the at least one desired personal characteristic desired by the ring wearer of a potential partner, the second means corresponding to a selection of the at least one desired personal characteristic made during the step of configuring, and wherein compatibility is indicated when at least the first means of the first match making ring is abutted with at least the second means of the second matchmaking ring, and wherein compatibility is not indicated when at least the first means of the first ring member cannot be abutted with at least the second means of the second ring member; and
    comparing the first matchmaking ring with the second matchmaking ring including abutting the first matchmaking ring with the second matchmaking ring.

2. The method of claim 1, further comprising the step of:
    determining compatibility with the person when the step of comparing results in a match between the first matchmaking ring and the second matchmaking ring.

3. The method of claim 2, wherein the step of comparing includes the step of attempting to engage the first matchmaking ring with the second matchmaking ring.

4. The method of claim 1, wherein the step of wearing the first matchmaking ring comprises the step of wearing the first matchmaking ring on a ring finger of a left hand.

5. The method of claim 1, further comprising the step of customizing the first matchmaking ring to include first means for identifying personal characteristics of the ring wearer and second means for identifying desired personal characteristics of the potential partner.

6. The method of claim 1 wherein each of the first and second matchmaking rings are formed independently of one another such that the second means for identifying at least one personal characteristic desired by the ring wearer of a potential partner of the first matchmaking ring is uniquely predetermined by the first ring wearer independently of the second ring wearer, and the second means for identifying at least one personal characteristic desired by the ring wearer of a potential partner of the second matchmaking ring is uniquely predetermined by the second ring wearer independently of the first ring wearer.

7. A system for use in determining compatibility between a first one of a plurality of people and a second one of the plurality of people, comprising a plurality of matchmaking rings, each matchmaking ring including first means for identifying at least one personal characteristic of a ring wearer and a second means for identifying at least one desired personal characteristic desired by the ring wearer of a potential partner, the at least one personal characteristic and the at least one desired personal characteristic selected from a predetermined list, and wherein compatibility is indicated when at least the first means of a first matchmaking ring is abutted with at least the second means of a second matchmaking ring, and wherein compatibility is not indicated when at least the first means of the first matchmaking ring cannot be abutted with at least the second means of the second matchmaking ring.

8. The system of claim 7, wherein the first means of the first matchmaking ring is adapted to slide into the second means of the second matchmaking ring to indicate that two people are compatible.

9. The system of claim 7, wherein the first means of the first matchmaking ring is adapted to be prevented from sliding into the second means of the second matchmaking ring to indicate that two people are incompatible.

10. The system of claim 7, wherein the first means includes at least one radially inward extending protrusion that extends axially from a first end toward a second end of the matchmaking ring, and wherein the second means includes at least one radially outward extending protrusion that extends axially from the second end toward the first end.

11. The system of claim 7, wherein each matchmaking ring includes a substantially planar outer surface, and wherein the first means includes at least one indentation in the substantially planar outer surface and wherein the second means includes at least one protrusion extending from the substantially planar outer surface.

12. The system of claim 7, wherein each matchmaking ring includes a first substantially planar surface and a second substantially planar surface, wherein the first means includes at least one indentation in the first substantially planar surface and the second means includes at least one protrusion extending from the second substantially planar surface.

13. The system of claim 12, wherein a correspondence between a first location of the at least one protrusion of the second substantially planar surface of a first matchmaking ring and a second location of the at least one indentation in the first substantially planar surface of a second matchmaking ring indicates that two people are compatible.

14. The system of claim 12, wherein a lack of correspondence between a first location of the at least one protrusion of the second substantially planar surface of a first matchmaking ring and a second location of the at least one indentation in the first substantially planar surface of a second matchmaking ring indicates that two people are incompatible.

15. The system of claim 7 wherein the first one of the plurality of people is the first ring wearer of a first matchmaking ring of the plurality of matchmaking rings, and the second one of the plurality of people is a second ring wearer of a second matchmaking ring of the plurality of matchmaking rings, and wherein each of the first and second matchmaking rings are formed independently of one another such that the second means for identifying at least one personal characteristic desired by the ring wearer of a potential partner of the first matchmaking ring is uniquely predetermined by the first ring wearer independently of the second ring wearer, and the second means for identifying at least one personal characteristic desired by the ring wearer of a potential partner of the second matchmaking ring is uniquely predetermined by the second ring wearer independently of the first ring wearer.

* * * * *